March 21, 1950     G. C. ELTENTON ET AL     2,501,598
MAGNETIC METHOD OF PIPE LINE INSPECTION
Filed July 28, 1947     4 Sheets-Sheet 1
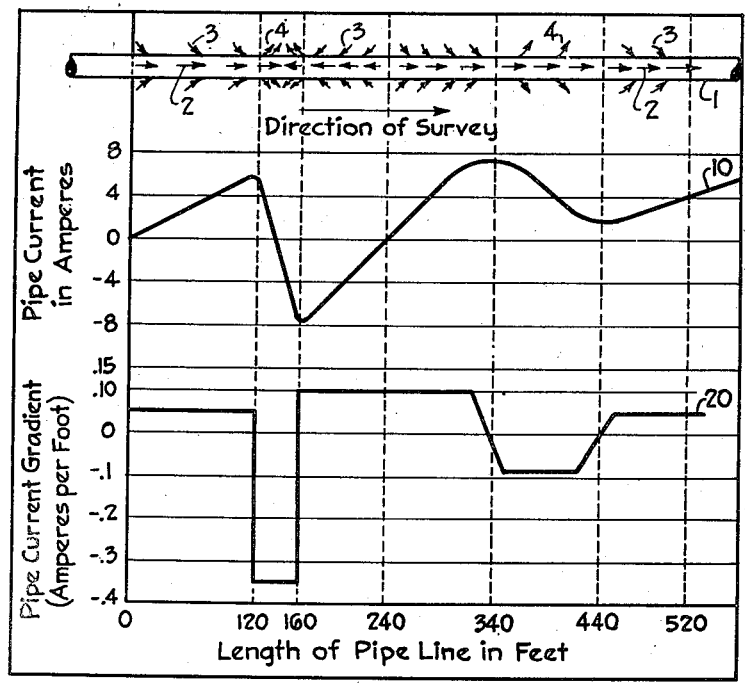
Fig.1
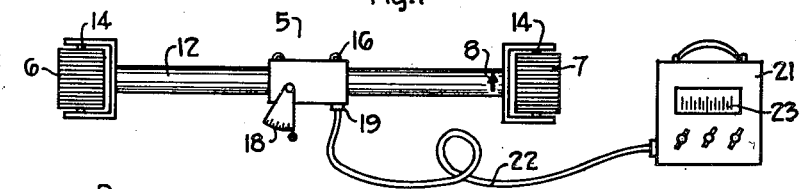
Fig.2
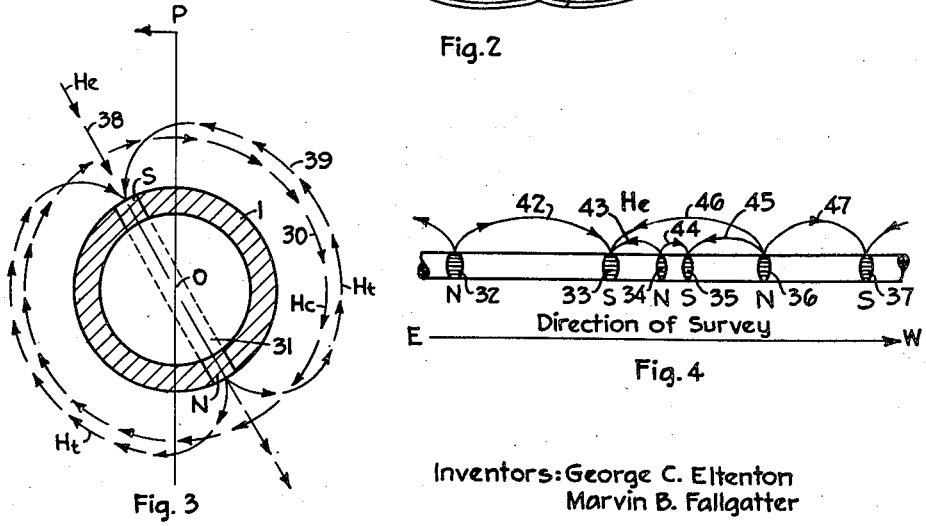
Fig.3
Fig.4
Inventors: George C. Eltenton
Marvin B. Fallgatter
By their Attorney:

March 21, 1950 G. C. ELTENTON ET AL 2,501,598
MAGNETIC METHOD OF PIPE LINE INSPECTION
Filed July 28, 1947 4 Sheets-Sheet 2

Inventors: George C. Eltenton
Marvin B. Fallgatter
By their Attorney:

Inventors: George C. Eltenton
Marvin B. Fallgatter

By their Attorney:

Inventors: George C. Eltenton
Marvin B. Fallgatter

By their Attorney:

Patented Mar. 21, 1950

2,501,598

UNITED STATES PATENT OFFICE 2,501,598

MAGNETIC METHOD OF PIPE-LINE INSPECTION

George C. Eltenton, Berkeley, and Marvin B. Fallgatter, San Leandro, Calif., assignors to Shell Development Company, San Francisco, Calif., a corporation of Delaware Application July 28, 1947, Serial No. 764,040

12 Claims. (Cl. 175—183)

This invention pertains to a method for surveying and measuring magnetic fields associated with electric currents which are of interest in connection with the determination of electrochemical factors causing corrosion of underground systems such as pipe lines.

The corrosion of pipe lines or other metallic conductors of considerable length is frequently attributable to the effect of electric currents flowing therein. These currents are due either to galvanic action, as when the pipe passes through soils having different chemical properties and moisture contents, or to a short-circuiting action, as when a pipe line serves as a return conductor for currents entering the ground from electric power systems. Electric currents of considerable magnitude often flow in such pipe lines, entering and leaving a pipe line at points depending on the properties of the soil and of the pipe line itself.

The electrical characteristics of a relatively complex system formed by a pipe line and the ground in which it is embedded are moreover, subject to changes due, for examples, to variations of temperature, moisture content of the soil, or to the shifting of the sources of extraneous currents, as in the case of electric railways.

It is therefore of great importance to survey the electric characteristics of such systems, and particularly to establish the points where a pipe line is anodic with regard to the ground, since severe corrosion occurs when current leaves the line to enter the ground. Suitable measures may then be taken to combat corrosion at such critical points by means involving, for example, improved insulation, cathodic protection, etc.

Various methods have been proposed to survey the electrical characteristics of buried pipe line systems and to determine the intensities of the currents flowing therein. These methods, however, commonly involve the use of measuring apparatus electrically connected to the pipe line, and thus require, for each measurement, the steps of uncovering at least a portion of the pipe line, and of puncturing its insulation in order that suitable low-resistance connections may be made between the pipe line and the measuring apparatus.

This results in slowing down the surveying operations, limiting the number of observation points, weakening the insulation of the pipe line, and disturbing the natural flow of electric currents therein, which may in turn lead to erroneous readings.

It is therefore an object of this invention to provide a method for measuring or determining the distribution, relative intensities and directions of flow of electric currents flowing in a pipe line by measuring the magnetic field phenomena set up by these currents in the proximity of the pipe line, whereby the necessity of electrically connecting the pipe line to the measuring apparatus is eliminated.

It is also an object of this invention to provide a method for effecting such measurements by means of any suitable gradiometer apparatus capable of measuring magnetic field space gradients in the proximity of the pipe line.

It is also an object of this invention to provide a method for the magnetic surveying of pipe lines giving data clearly indicating to the operator the regions in which the electric currents in pipe lines reverse their direction of flow, and the regions in which electric currents enter the pipe line from the ground, or leave the pipe line to enter the ground.

These and other objects of the present invention will be understood from the following description, taken with reference to the attached drawings, wherein:

Fig. 1 is a diagram illustrating the distribution, direction of flow and gradients of electric currents along a pipe line.

Fig. 2 is a diagram schematically showing a gradiometer type device suitable for carrying out the method of this invention.

Fig. 3 is a diagram illustrating the distribution of magnetic fields about a pipe line shown in transverse cross-section.

Fig. 4 is a longitudinal view of the same pipe line drawn to a different scale.

Figure 5:
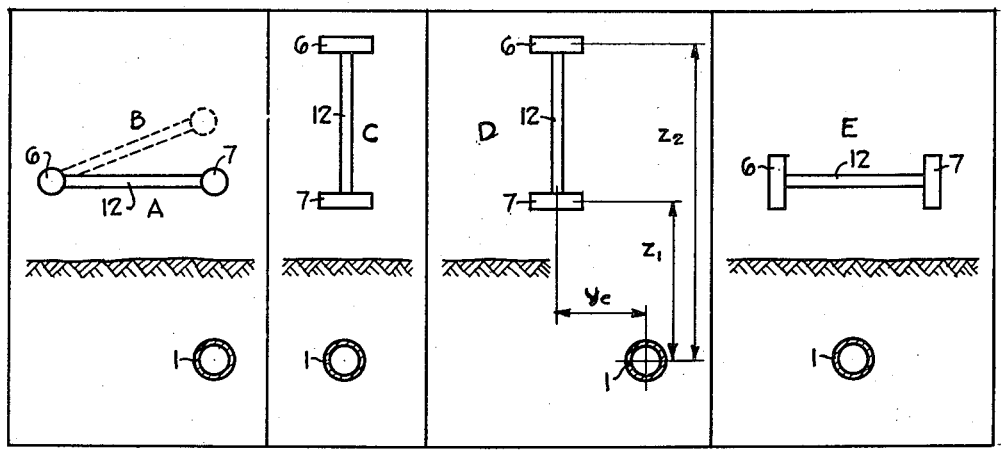
Fig. 5 is a diagram illustrating the various positions in which a magnetic gradiometer may be held while taking measurements according to the method of the present invention.

The diagram of Fig. 1 illustrates, as a general example, the typical characteristics of electric currents which may be carried by a pipe line 1, shown as extending over an arbitrary interval of 520 feet. The flow of electric current in pipe 1, and the direction of this flow, is indicated by arrows 2, while current entering the pipe from the ground is indicated by arrows 3, and current leaving the pipe to enter the ground is indicated by arrows 4. Assuming that the intensity of the current at any point in the pipe line is such as plotted by means of curve 10, then the rate at which the current enters or leaves the pipe line, that is, the gradient of said current in the pipe line, is represented by the slope of curve 10, which slope may be independently plotted as a curve 20.

As stated above, dangerous corrosive conditions may be expected to occur along a pipe line mainly in places where the pipe line is anodic with regard to the ground and where the current leaves the pipe to enter the ground. Such corrosive regions appear in the diagram of Fig. 1 in the intervals from 120 to 160 ft., and from 340 to 440 ft., that is, at the intervals where the current has a negative gradient. Steady currents, or currents having a positive gradient are relatively harmless. Since, however, the sign of the gradient depends on the direction in which the pipe line is surveyed or viewed, it is necessary, for the purposes of this invention, to correlate negative gradients with regions where the current leaves the pipe, and positive gradients with regions where the current enters the pipe.

A fixed uniform notation will therefore be followed hereinbelow in assigning positive or negative values to the direction of the current and to its gradient. According to this notation, currents flowing in the direction in which the survey is made, that is, from 0 to 520 ft. in the example of Fig. 1, are held to be positive, (as in intervals between 0 and 140 ft. and between 240 and 520 ft.), while currents flowing in the opposite direction are held to be negative (as between 140 and 240 ft.). Current gradients are always viewed in the direction in which the current is flowing. Thus, a current, either positive or negative, whose intensity is increasing in the direction in which the current flows, has a positive gradient, as shown by the slope of curve 10 or by the curve 20 in the intervals from 0 to 120 ft., from 160 to 340 ft. and from 440 to 520 ft., while a current whose absolute magnitude decreases in the direction of flow, has a negative gradient as shown in intervals from 120 to 160 ft. and from 340 to 440 ft.

It is obvious from Fig. 1 that if the sign and magnitude of electrical current gradients in a pipe line could be measured directly, it would be a relatively simple matter to determine the places where corrosion or dangerous corrosive conditions occur. Since, however, as explained above, direct electrical measurements involve objectionable drawbacks in practical work, the present invention provides a method for measuring said current gradients by determining the gradients of the magnetic fields associated with said currents.

The measurement of magnetic field gradients is most conveniently effected by means of apparatus of the gradiometer type capable of measuring the magnetic gradient between two reference points in fixed mutual space relationship. Any type of gradiometer having a satisfactory sensitivity and accuracy may normally be used for the purposes of the present invention, such for example as the gradiometers described in U. S. Patents Nos. 2,151,627, 2,358,027, 2,382,743, etc.

A device of this general type is diagrammatically illustrated in Fig. 2 and comprises a probe or pick-up unit generally designated by 5, and a power and indicating unit shown at 21. The probe unit 5 comprises two substantially identical field sensitive elements or coils 6 and 7 mounted about the same or parallel axes 14 at the ends of a rigid spacing member 12. For the purposes of the present invention, the spacer 12 may have any desired length such as from 2 to 20 feet. The spacer 12 may be provided at its center with clamp means 16, whereby the gradiometer may be clamped to a fixed support or cradle or carried on a strap on the shoulders of the operator, and with graduated sector or plumb-bob means 18, whereby the angular deflection of the axis of spacer 12 from a vertical or horizontal plane may be accurately determined. The gradiometer 5 is also provided, as at 19, with the necessary circuit connections, whereby the coils 6 and 7 may be electrically connected, through the spacer 12 and a cable 22, to the unit 21, comprising a suitable source of power supply which may be necessary for energizing the coils 6 and 7, and for operating suitable bridge or measuring circuits having an indicator or recorder element 23.

An arrow 8 is marked on the gradiometer to identify one of the coils, for example, coil 7, as well as the direction in which the axis of said coil is held at any given time during the operations. When the coils 6 or 7 are suitably energized, either mechanically or electrically, as described in the patents referred to, and are placed in a uniform magnetic field, their reactions with said field neutralize each other, and the indicator 23 gives a zero or null reading. If, however, coils 6 and 7 are placed in a magnetic field which is stronger at the location of one of the coils than at the location of the other coil, that is, in a field having a magnetic gradient, the unit 21 registers the difference of the reaction of the two coils with this variable strength field, and the indicator 23 gives a reading proportional to the gradient of said field, and showing its direction.

In applying the present method of magnetic field measurements in the proximity of a pipe line carrying an electric current, it is necessary to take in consideration the fact that this field is not merely a function of this current, but is the resultant of several possible different fields superimposed on each other, namely:

1. A magnetic field due to the electric current flowing in the pipe line;
2. The earth's magnetic field as distorted by the magnetic material of the pipe line;
3. A field due to transverse poles appearing along the pipe line at diametrically opposite sides thereof;
4. A field due to discontinuous longitudinal poles spaced along the pipe line.

The object of this invention is to measure as accurately and as rapidly as possible effects due to the first of these fields under conditions eliminating or minimizing errors due to the other fields.

Referring to Fig. 3, the pipe line 1 is shown as extending at right angles to the plane of the paper in a direction which is assumed to run generally from east to west along the line of survey, as shown in Fig. 4.

When the pipe 1 carries a positive current, as defined above, it is surrounded by a concentric cylindrical magnetic field $H_c$ indicated by the circle of broken arrows 30.

This magnetic field is superimposed on a second magnetic field, namely the earth field as distorted by the magnetic material of the pipe line, said distortion being due to magnetic induction in the ferrous material of the pipe. This second field, unlike the first, is asymmetric and changes with the azimuth of the pipe line, and the constants of the earth's field. This field $H_e$, which is represented by the broken arrows 38, induces in the material of the pipe line diametrically opposite or transverse poles N and S. These poles, in a pipe line of a material of uniform magnetic properties, would extend continuously along the pipe line. These poles are joined by lines of force forming a field $H_t$ designated by the broken arrows 39. The effect of this field $H_t$ at some point P, located exteriorly to the pipe in a vertical plane passing through the axis of the pipe, may be considered equal to that produced at said point P by a strip of an imaginary permanent magnet 31 having its poles N and S separated by a distance equal to the inner diameter of the pipe. If the axis of the pipe line swings, along its course, from an east-west to a south-north direction, the angle between the field $H_e$ and the vertical line OP becomes zero, and the imaginary magnet 31 assumes a vertical position, with a south pole running along the upper side of the pipe and a north pole along the lower side of the pipe. In this case only will there be no horizontal component of the field $H_t$ such as indicated by the vector arrow at P. For all other azimuths of the pipe line, there will be such a component which will add to or subtract from the horizontal component of the field $H_c$ produced by the current flowing in the pipe line.

Besides the magnetic fields discussed hereinabove, there is in the proximity of the pipe line still another field due to spaced poles appearing at points longitudinally distributed along the pipe line. Referring to Fig. 4, such north and south poles are indicated at 32, 33, 34, 35, 36 and 37, while the lines of force joining them and forming a longitudinal magnetic field, or a plurality of such fields, are diagrammatically indicated at 42, 43, 44, 45, 46 and 47. It will be noted that this field or fields are co-axial with the pipe line, or at right angles to the fields shown in Fig. 3. These fields are due to permanent magnetism effects of the pipe line, and the concentration of these effects at points such as the poles 32—37 may be explained by such extraneous causes as welding, stresses imposed on the pipe during construction, etc. Both the spacing and the magnitude or strength of poles 32—37 is therefore quite irregular, and in some cases the field between two strong poles, such as field 46 between poles 33 and 36, is further distorted by reaction with the fields 43, 44 and 45 due to the weaker poles 34 and 35 located between the poles 33 and 36. These longitudinal poles interact with the transverse poles shown in Fig. 3, causing the course of the latter to deviate from straight lines running along diametrically opposite sides of the pipe line.

Fig. 5 is a diagram showing the various positions in which the gradiometer of Fig. 2 may be held in making measurements according to the method of the present invention. Referring to this diagram, the gradiometer in position A is arranged horizontally, with the axis of one of its pick-up coils being in the vertical plane passing through the axis of the pipe line 1, the axes of the two pick-up coils 6 and 7 being parallel to the axis of the pipe line. Position B will be referred to hereinbelow. In position C, the gradiometer is held in the vertical plane passing through the axis of the pipe line, the axes of the two pick-up coils being at right angles to the axis of the pipe line. In position D, the gradiometer is held in the same manner as in C, but in a plane parallel to the vertical plane passing through the axis of the pipe line and offset therefrom by a critical distance $y_c$ to be discussed hereinbelow. The vertical distances between the axes of the two coils and the axis of the pipe line are indicated as $z_1$ and $z_2$. In position E, the gradiometer is held horizontally above the pipe line with the axes of its coils arranged symmetrically with regard to the axis of the pipe line in a vertical plane perpendicular thereto. In the discussion and equations appearing hereinbelow, displacements of the reference points or axes of the gradiometer coils along the axis of the pipe line (that is, in a direction normal to the plane of the paper in Fig. 5) will be referred to as occurring along the x-axis; displacements perpendicular to the axis of the pipe line in a horizontal plane passing through the axis of the pipe line or parallel thereto will be referred to as occuring along the y-axis, and displacements perpendicular to the axis of the pipe line in a vertical plane passing therethrough or parallel thereto will be referred to as occurring along the z-axis. For simplicity, it is assumed that the axis of the pipe line is substantially horizontal, since in practice pipe lines do not often deviate to any significant degree from the horizontal.

When the gradiometer of Fig. 2 is used to measure the gradient or difference of field strength at some point on a pipe line between two longitudinal poles of arbitrary magnitude $m_1$ and $m_2$ (such as poles 32 and 33 of Fig. 4), which are separated from each other by a distance $d$, it can be shown that the gradients along the above coordinate axes of the components due to the fields discussed hereinabove are expressed by the following equations, some approximations being used for simplicity:

1. The vertical gradient of the y-axis field component due to the longitudinal poles is equal to:

$$G_1 = m_1 y \left[ (x^2+y^2+z_2^2)^{-\frac{3}{2}} - (x^2+y^2+z_1^2)^{-\frac{3}{2}} \right]$$
$$- m_2 y \left[ ((d-x)^2+y^2+z_2^2)^{-\frac{3}{2}} - ((d-x)^2+y^2+z_1^2)^{-\frac{3}{2}} \right] \quad (1)$$

2. The transverse horizontal gradient of the x-axis field component due to the longitudinal poles is equal to:

$$G_2 = m_1 x \left[ (x^2+y_2^2+z^2)^{-\frac{3}{2}} - (x^2+y_1^2+z^2)^{-\frac{3}{2}} \right]$$
$$+ m_2(d-x) \left[ ((d-x)^2+y_2^2+z^2)^{-\frac{3}{2}} - ((d-x)^2+y_1^2+z^2)^{-\frac{3}{2}} \right] \quad (2)$$

3. The transverse horizontal gradient of the z-axis component due to the longitudinal poles is equal to:

$$G_3 = m_1 z \left[ (x^2+y_2^2+z^2)^{-\frac{3}{2}} - (x^2+y_1^2+z^2)^{-\frac{3}{2}} \right]$$
$$- m_2 z \left[ ((d-x)^2+y_2^2+z^2)^{-\frac{3}{2}} - ((d-x)^2+y_1^2+z^2)^{-\frac{3}{2}} \right] \quad (3)$$

4. The vertical gradient of the y-axis field component due to induced transverse poles is equal to:

$$G_4 = -H_e \cos D \sin A \left[\frac{y^2-z_2^2}{(y^2+z_2^2)^2} - \frac{y^2-z_1^2}{(y^2+z_1^2)^2}\right]k$$
$$+ H_e \sin D \left[\frac{yz_2}{(y^2+z_2^2)^2} - \frac{yz_1}{(y^2+z_1^2)^2}\right]2k \quad (4)$$

5. The transverse horizontal gradient of the z-axis field component due to induced transverse poles is equal to:

$$G_5 = -H_e \sin D \left[\frac{z^2-y_2^2}{(z^2+y_2^2)^2} - \frac{z^2-y_1^2}{(z^2+y_1^2)^2}\right]k$$
$$+ H_e \cos D \sin A \left[\frac{y_2 z}{(z^2+y_2^2)^2} - \frac{y_1 z}{(z^2+y_1^2)^2}\right]2k \quad (5)$$

6. The vertical gradient of the y-axis field component due to pipe line current is equal to:

$$G_6 = -6.57 I \left(\frac{z_2}{z_2^2+y^2} - \frac{z_1}{z_1^2+y^2}\right) \quad (6)$$

7. The transverse horizontal gradient of the z-axis field component due to pipe line current is equal to:

$$G_7 = 6.57 I \left(\frac{y_2}{y_2^2+z^2} - \frac{y_1}{y_1^2+z^2}\right) \quad (7)$$

In the above equations the following symbols have been used:

G is the magnetic gradient in milligauss.
D is the magnetic dip angle of the field $H_e$.
A is the magnetic azimuth of the pipe line.
I is the current in the pipe line in amperes.
k is a factor equal to $r^2$ $$\left(1 - \frac{2r}{\eta t}\right)$$

wherein $r$ is the outside radius of the pipe, $t$ is its wall thickness, and $\eta$ is its permeability. The factor $k$ may usually be assumed to have a value of 0.1.

Subscript one is used to denote the coordinate of the coil whose coordinate is algebraically the smaller, and subscript two is used to denote the coordinates of the other coil.

Figure 6:
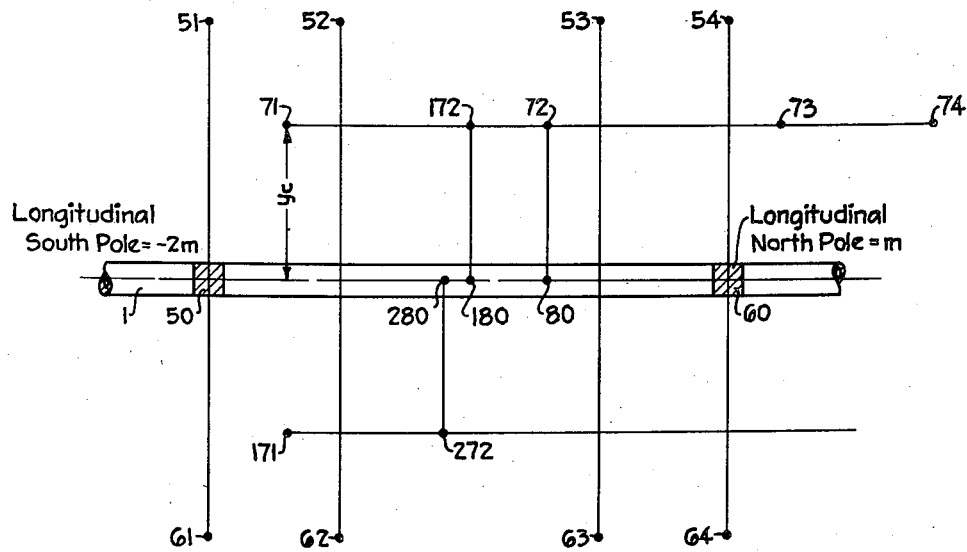
Fig. 6 is a plan view of a pipe line schematically indicating survey lines along which measurements are effected according to the method of the present invention.

Fig. 6 illustrates a set of conditions used in calculating some values of the Equations 1, 4 and 6.

An 8-inch pipe 1 shown in plan view carries a current of 1 ampere. The pipe has a longitudinal south pole 50 which is twice as strong as a longitudinal north pole 60 spaced 20 feet therefrom. A gradiometer such as shown in Fig. 2, held in a position such as shown at D in Fig. 5, is moved across the pipe line and at right angles thereto from a point 51 located 10 ft. to one side from the axis of the pipe line, to a point 61, located 10 ft. to the other side therefrom. This motion is then repeated for points 52—62, 53—63 and 54—64. It will be seen that the line 51—61 passes directly over the longitudinal south pole 50, while line 54—64 passes directly over the longitudinal north pole. In other words, the x-axis coordinate, as defined hereinabove, had the respective values of 0, 5, 15 and 20 feet for the four transverse motions along lines 51—61, 52—62, 53—63 and 54—64, while the y-axis coordinate varied along each of said lines from 10 feet to zero, and from zero to —10 feet. The gradiometer had a coil separation of 5 feet and the axis of the lower coil was held at 5 feet above the axis of the pipe lines, the z-axis coordinates having thus a constant value of $z_1 = 5$ feet for the lower coil and of $z_2 = 10$ feet for the upper coil. The earth field was assumed to have a value of $H_e = 600$ gauss, and to have a dip angle of 60°, the pipe line running from east to west.

Figure 7:
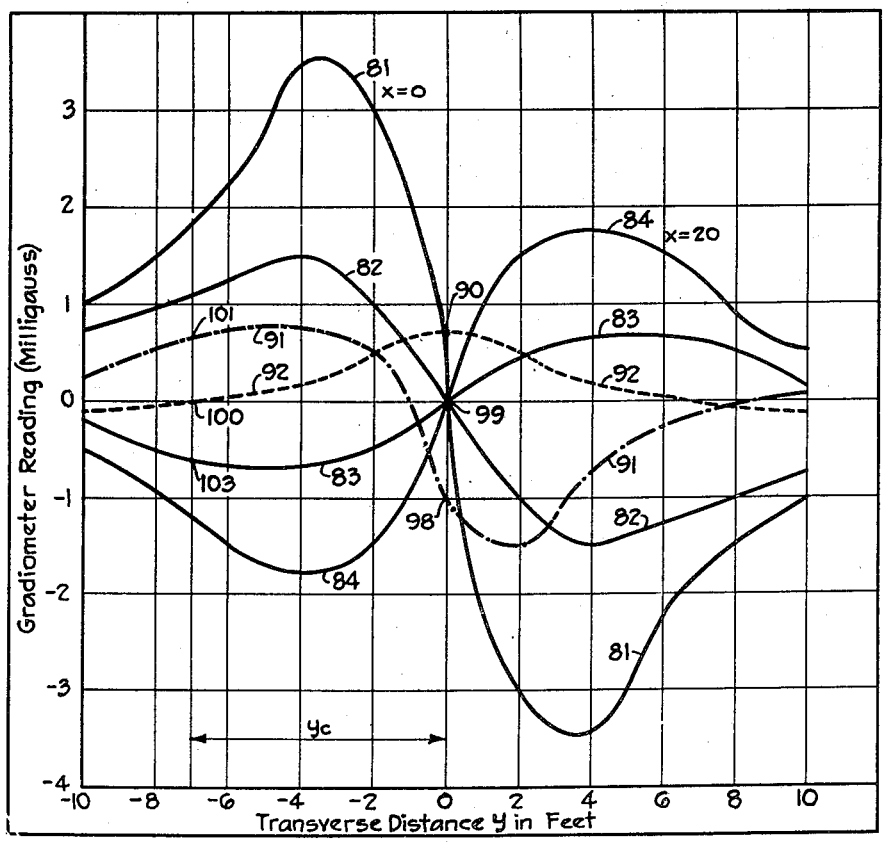
Fig. 7 is a chart showing, in the form of curves, the calculated variations of magnitude, in a plane normal to the axis of a pipe line, of the different components of the magnetic field surrounding said pipe line.

The values calculated with these assumptions are plotted in the form of the curves shown in Fig. 7. Curves 81, 82, 83 and 84 represent the values calculated from Equation 1 for the field due to the longitudinal poles 50 and 60 along lines 51—61, 52—62, 53—63 and 54—64, respectively. It will be seen that these curves are symmetrical with regard to the pipe line, and have a zero value when the gradiometer is directly over the pipe line, that is, when its y-axis coordinate is equal to zero. It will also be seen that the curves 81 and 84, whose x-axis coordinates are equal to 0 and 20 feet respectively have a greater amplitude than curves 82 and 83 taken intermediate between the two poles and having x-axis coordinates of 5 and 15 feet respectively. Curve 83, plotted for a condition along line 53—63, where the stronger pole 50 was three times farther away than the weaker pole 60, has the smallest amplitude. It is therefore evident that for some pipe intercept between two longitudinal poles there will be a line in the y-direction along which the vertical gradient of the y-axis magnetic field component due to the longitudinal poles will be at a minimum and substantially zero.

Curve 91 was plotted from values calculated from Equation 4 and thus represents the gradient values of the y-component of the field due to the transverse poles induced in the pipe line by the earth field. This field, and therefore the deflections of the gradiometer, are in this case independent of the x-axis coordinates, so that only one curve is necessary. This curve is asymmetric with regard to the y-axis, except for cases of pipe lines running in a straight north-south direction. It is to be noted that the slope of this curve is always negative at $y=0$. The effect of this field component will therefore be increased in the vicinity of a longitudinal south pole and decreased in the vicinity of a longitudinal north pole. It follows that it is possible to find some value of the x-axis coordinate such that the slope value due to longitudinal poles substantially cancels the slope value due to the induced transverse poles.

Curve 92 was plotted from values calculated from Equation 6 and thus represents the gradient values of the y-component of the field due to the current flowing in the pipe line. This curve is also independent of the x-axis coordinates so long as the current in the pipe line remains constant. The sign of the deflection of the gradiometer will change with the sign or direction of flow of the current; however, for simplicity, only one curve of this type has been shown in Fig. 7.

The most interesting feature of this curve is the existence of a point 100 at a critical distance $y_c$ from the axis of a pipe, at which point the field due to the current flowing in the pipe line exerts no influence on the gradiometer when the coils of the latter are held in the position shown at C or D of Fig. 5. It may be shown that this critical distance $y_c$ is related to the values $z_1$ and $z_2$ that is, the vertical distances from the axes of the two coils of the gradiometer to the axis of the pipe line, by the expression $$y_c = \pm \sqrt{z_1 z_2} \quad (8)$$

whereby the desired values of $y_c$ may be easily calculated and tabulated for any desired separation between the axes of the two coils and of the pipe line.

Based on the above theoretical considerations and calculated data, which can be readily checked by gradiometer measurements along an experimental or actual pipe line, the essence of the method of the present invention can be briefly outlined as follows.

It is understood that this method, while remaining based on the same principle, is susceptible of various modifications depending on the particular characteristics of the pipe line or surrounding terrain and on the speed and accuracy required in each case. Some of these modifications are therefore briefly described in the following examples, which further illustrate the method of the present invention by means of numerical values.

EXAMPLE I

From the dimensional constants of the gradiometer and the depth of the pipe line, which is either known or can be readily determined, as will be shown hereinbelow, the operator determines the critical distance $y_c$ from the axis of the pipe line, in accordance with Equation 8. He then places the gradiometer at any point 71 (Fig. 6), removed from the pipe line by said distance $y_c$, the gradiometer thus being in the position D of Fig. 5. The gradiometer is then moved along a line 71—73, parallel to the axis of the pipe line, and its indications are continuously observed. When, at some point 72, the reading of the gradiometer decreases to a predetermined value which in this case should be zero, the advance of the gradiometer along line 71—73 is stopped. It will be apparent that at point 72, which is at a critical distance $y_c$ from the pipe line, the effect of the field of the pipe line current on the gradiometer will be nil, as at point 100 on Fig. 7. It will also be seen that the reason why the gradiometer gives a zero or minimum reading at point 72 is that, at this point, the field gradients due to the longitudinal poles and to the transverse poles cancel or tend substantially to cancel each other. In other words, the ordinates of curves 83 and 91 are at that point, substantially equal and opposite in sign, as may be seen from intercepts 101—109 and 103—100 in Fig. 7, the curve 83 having been automatically selected from the group of curves 81, 82, 83, 84, etc. by the steps of moving the gradiometer along a line 71—73 removed by the critical distance $y_c$ from the pipe line, and stopping it at a point 72 giving a zero reading.

The gradiometer is then moved at right angles to the axis of the pipe line to a point 80, located right above the axis of the pipe line, and a reading of the gradiometer is taken and recorded. By reference to Fig. 7 it will be seen that at point 80 the influence of the longitudinal poles on the gradiometer is zero, while the influence of the field due to the pipe current is at a maximum, since the displacement between the points 72 and 80 of Fig. 6 corresponds to a displacement between points 100 and 90 along curve 92 of Fig. 7. The only influence on the gradiometer other than that of the field due to the current in the pipe line is, at point 80, that of the transverse poles induced in the pipe line by the distorted earth field, as represented by the intercept 98—99 in Fig. 7. This is, however, an easily calculable constant. Furthermore it is obvious that by this method of selection the slopes of curves 83 and 91 have always an opposite sign and tend therefore to cancel each other, thereby minimizing the errors due to a slight misplacement of the coils to one side or the other of the vertical plane through the axis of the pipe.

After the reading of the gradiometer at point 80 had been taken and recorded, the gradiometer is returned to point 72 and is then moved on along the line 71—73 until a new minimum or zero reading is obtained at a point 74, whereupon the operations described with regard to points 72 and 80 are repeated. All the readings taken at points directly above the axis of the pipe line, such as point 80, are recorded, corrected for distortion represented by Equation 5, and the corrected values are plotted in the form of a curve, which may be similar to that of Fig. 1 curve 10, showing the values of the currents in the pipe line.

EXAMPLE II

When the location of the pipe line is quite unknown, it should be first determined, at least for one point, by any desired means, including the drilling of a hole by means of an auger, the use of electrical pipe-locating devices such as are known in the pipe-line arts, etc.

When the location of the pipe-line is known with an accuracy of about ±10 ft., the gradiometer of Fig. 2 is held horizontally and at right angles to the assumed direction of the axis of the pipe line, the axes of the two coils being parallel to the axis of the pipe line. The gradiometer is then moved at right angles to the axis of the pipe line until its reading is substantially zero, at which moment the pipe line is directly below the midpoint of the gradiometer. The course of the pipe line may be marked in any desired manner, for example, by means of a string stretched on the ground.

After the location of the pipe line has been determined, the gradiometer is laid on the ground at right angles to the pipe line with one of the coils, for example, coil 7, having its axis parallel to the axis of the pipe line in a vertical plane passing through the axis of the pipe line, as shown at A in Fig. 5. The gradiometer is then rotated about the other coil 6 until a zero or minimum reading is obtained when coil 7 has been raised to some point such as shown in position B. The two coils are then equally distant from the pipe line, and the depth at which the pipe line is buried can be readily calculated from the angular reading of the sector indicator 18. This indicator may furthermore, if desired, be calibrated to give readings directly indicating the depth of the pipe line, such calibration being based on the physical dimensions of the gradiometer.

The critical distance $y_c$ is then calculated from Equation 8, and the gradiometer is placed in position D of Fig. 5 with regard to the pipe line, with one of the coils, for example coil 7, always held as the lower coil, and the arrow 8 always pointing in the same direction, for example, from the left to the right of the operator carrying the gradiometer. The operations should preferably start at the more southerly of the two ends of the marked course of the pipe line. When advancing into the NW quadrant, the critical distance $y_c$ is measured to the left of the pipe line, and when advancing into the NE quadrant, it is measured to the right of the pipe line.

The measurements are then carried out as described in Example I, and are completed by taking an accurate measurement of the distance from the starting point, of each of the points at which measurements were taken above the pipe line. When especially great precision is required, the depth of the pipe line may be measured at each of the points of the readings.

When the measurements have been made as described above, currents flowing north will tend to give a positive reading, and those flowing south will give a negative reading. Superimposed on all the readings, however, will be the effect attributable to the distortion of the earth field by the magnetic material of the pipe, that is, the effect represented by the curve 91 in Fig. 7. As shown above, this distortion varies with the magnetic azimuth, depth and size of the pipe, and has a value which can be readily calculated from Equation 4 hereinabove for a condition wherein $y=0$.

It is to be noted that this equation comprises three factors which may be grouped as follows:

$$g = .01\ H_e \sin A \cos D \qquad (9)$$

wherein $g$ may be termed the geographic factor which is constant for a given locality;

$$k = r^2\left(1 - \frac{2r}{\eta t}\right) \qquad (10)$$

wherein $k$ is the same as in Equation 4 and may be termed the pipe factor which is constant for a given pipe diameter and wall thickness; and $$a = 100\left(\frac{1}{z_2^2} - \frac{1}{z_1^2}\right) \qquad (11)$$

wherein $a$ may be termed the depth factor to correct for varying depth.

To simplify calculations, values of $g$, $k$ and $a$ may be calculated for a particular location or set of conditions, and tabulated or plotted in the form of table or graphs. Field data are then readily corrected by reference to said tables or graphs.

Figure 8:
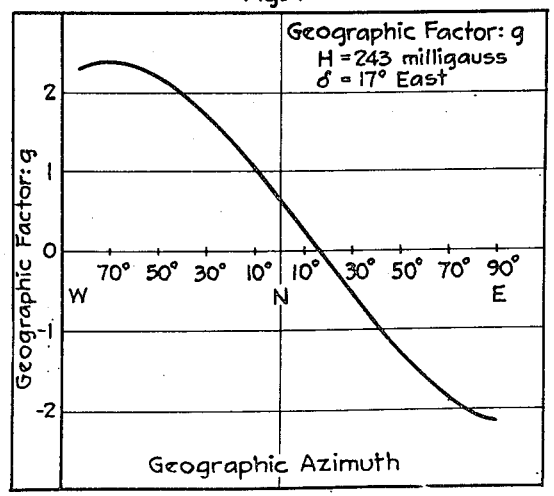
Figs. 8 to 12 are examples of calibrated charts which may be used in carrying out the method of the present invention to simplify computations.

Thus, for example, if a pipe line is being surveyed in a locality on the west coast where the horizontal component of the earth field $$H_e \cos D = H = 243$$

milligauss, and the magnetic declination $\delta$ from geographic north is 17° east, the geographic factor $g$ may be calculated and plotted in the form of the curve shown in Fig. 8.

Likewise, the depth factor $a$ may be calculated and plotted in the form of a curve shown in Fig. 9, while values of the pipe factor $k$ may be tabulated in a table such as shown hereinbelow:

*Table I*

| Pipe Diameter, inches | Pipe Wall Thickness, inches | Factor $k$ |
|---|---|---|
| 6 | .28 | .06 |
| 8 | .30 | .10 |
| 10 | .30 | .16 |
| 12 | .33 | .23 |
| 20 | .30 | .58 |

Figure 10:
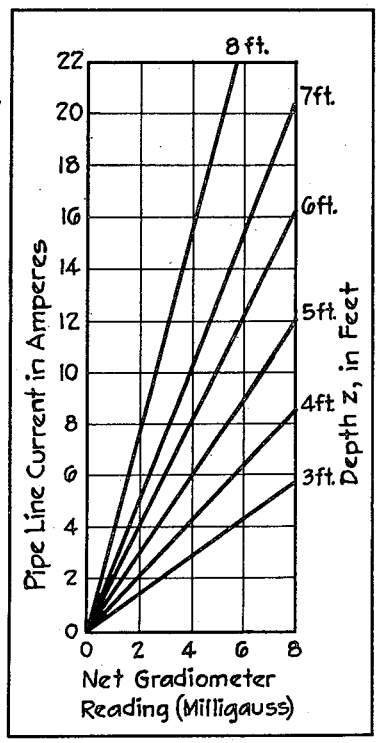

Finally, in order further to simplify calculations, the relationship between the depth $z$, the net gradiometer reading $(G_n)$ in milligauss, and the pipe line current in amperes, may be expressed in the form of calibration curves such as shown in Fig. 10, wherein said relationship is plotted for six different values of $z_1$ (distance between pipe line and lower coil) varying from 3 to 8 feet.

Figure 9:
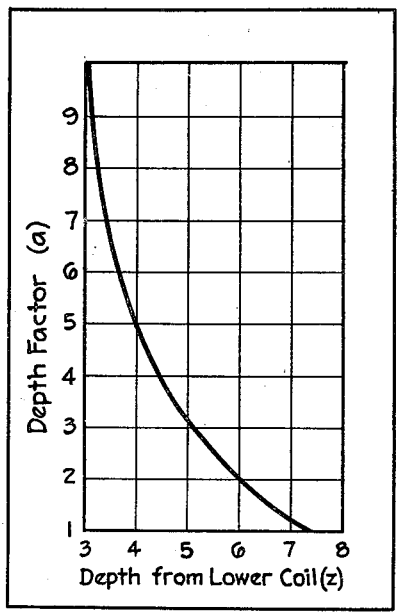

If then, the pipe line of the present example is an 8-inch line having a geographical azimuth of N50°W, and a reading of $R = -5$ milligauss has been obtained at a particular point with the lower coil held at a distance of 5 feet above the axis of the pipe line, the current in said point can be determined as follows:

A value $g = 2.2$ is found from the chart of Fig. 8, a value $k = .10$ is found from Table I, and a value $a = 3.1$ is found from the chart of Fig. 9. Equation 4 gives therefore under these conditions a value of:

$$(2.2)(0.10)(3.1) = 0.68\ \text{milligauss}$$

The gradiometer reading can therefore be corrected to give a net reading of:

$$G_n = (-5) + (0.68) = -4.3\ \text{milligauss}$$

Hence the current flowing in the pipe may be determined from the chart of Fig. 10 as being equal to $-6.6$ amperes, and since it is negative, it is flowing south, that is, towards the operator as the latter proceeds in a northerly direction.

EXAMPLE III

When it is not desired to obtain absolute values of the currents flowing in a pipe line, but only their relative values, distribution and direction of flow along the pipe line, thereby shortening by about 50% the time consumed in operations described in Example II, the following procedure, which dispenses with the necessity of accurately marking the course of the pipe line, may be followed.

Referring to Fig. 6, the operator starts again from point 71 located at a critical distance $y_c$ from the pipe line, holding the gradiometer as in Example I. Instead, however, of progressing to the point 72, where the gradiometer reading has a predetermined value which is substantially zero, he stops at a point 172 where said reading has a predetermined value calculated from the charts in a manner to be described hereinbelow. The gradiometer is then slowly moved toward the pipe line at right angles thereto, that is, along line 172—180. If, before the gradiometer passes over the axis of the pipe line, its reading gives a maximum value, this maximum value is recorded, and a marker is left at this point for subsequent distance measurements.

If no such maximum reading is obtained before point 180 is reached, the operator returns to a point 171, corresponding to point 71, but spaced to the right-hand side of the pipe line by the critical distance $y_c$. He then proceeds as before along the pipe line until the gradiometer gives, at a point 272, a predetermined reading calculated from the charts for the right-hand side of the pipe-line. Proceeding then towards the pipe-line at right angles thereto, a sharp minimum should be encountered before the gradiometer passes over the axis of the pipe line at point 280. The value of this minimum reading is recorded, and a marker dropped as before. The principle underlying this procedure is that a maximum on the left-hand side of the pipe line is intensified by a current flowing north, that is, in the direction of the gradiometer's advance, while a minimum on the right-hand side of the pipe-line is similarly intensified by a current flowing south. This procedure, when continued along the course of the pipe line, gives a qualitative or semi-quantitative survey of the current distribution along the pipe line, without, however, permitting the measurement of absolute current values.

Figure 12:
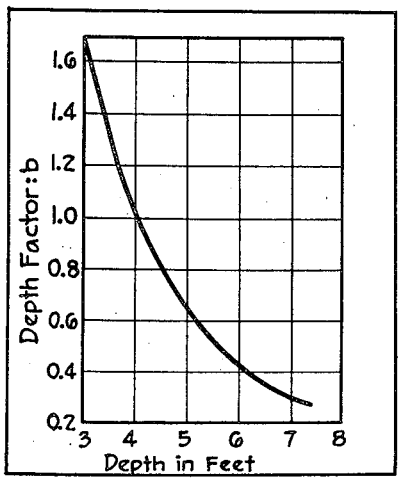
Figure 11:
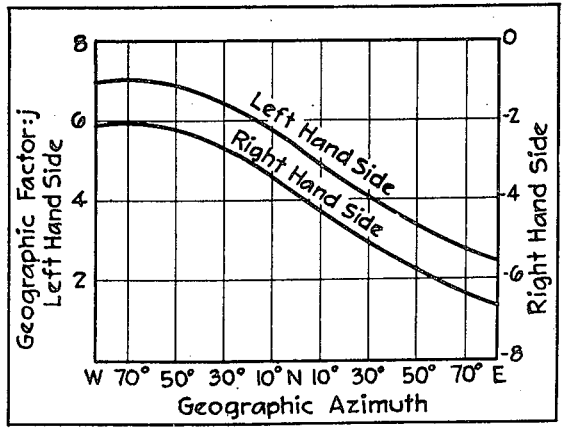

In order to calculate the predetermined readings at which the gradiometer must be stopped at points 172 or 272, the factor $k$ obtained from Table I is multiplied by a geographic factor $j$ obtained from the chart of Fig. 11, and by a depth factor $b$ obtained from the chart of Fig. 12, calculated and plotted from the equations given hereinabove in a manner similar to that described with regard to Example II.

Thus, assuming the same constants as in Example I, it is found that $j$ has a value of $+6.8$ for the left-hand side of the pipe line, and a value of −2.2 for the right-hand side of the pipe, while b has a value of 0.64.

Therefore, the critical predetermined reading at which the gradiometer must be stopped along line 71—172 is (0.1)(0.64)(+6.8)=0.44, while along line 171—172 it is (0.1)(0.64)(−2.2)=−0.14

EXAMPLE IV

Whenever a gradiometer can be used which has a considerable spacing, such as 12 feet or more, between the field-sensitive elements or coils 6 and 7, the procedure of Example I may be modified as follows:

The gradiometer is held in a horizontal position with the axes of the gradiometer coils in a vertical position, as shown at E in Fig. 5, and the mid-point between said coils being directly above the axis of the pipe-line. The gradiometer is then advanced, still in the same horizontal position, (at right angles to the axis of the pipe-line), along the pipe-line and above the axis thereof, being at the same time subjected to an oscillatory motion in the horizontal plane of its motion from right to left and from left to right.

It will be seen, by reference to Figs. 6 and 7 that when the gradiometer is passing over a point such as the longitudinal pole 50, where the curve 81 has an extremely steep slope, the oscillatory motion of the gradiometer will result in rapid variations or oscillations of the gradiometer readings from high positive to high negative values. As, however, the gradiometer advances toward points 280 and 180, these variations will gradually decrease until, at a certain point, the oscillation of the gradiometer will cause substantially no variation in the magnitude of its reading, which remains substantially constant at a certain value, which indicates that a point similar to point 80 in Example I has been reached.

The position of the gradiometer is then carefully checked to determine that its axis is horizontal and at right angles to the axis of the pipe-line, that the axes of the two coils are vertical, and that the coils are equidistant from the axis of the pipe-line. A reading is then taken and recorded, and the operations continued along the pipe-line. These readings may then be converted to equivalent pipe-line currents by the use of appropriate conversion curves or charts similar to those used to illustrate Example II.

EXAMPLE V

The same procedure is followed as in Example I, except that the significant reading is taken and recorded at point 80 when the gradiometer is disposed with its axis arranged horizontally in a vertical plane passing through the axis of the pipe-line and the axes of the coils are held at right angles to the axis of the pipe-line in a horizontal plane. In this position longitudinal gradients of transverse horizontal components will be measured, and it can be shown that these may vanish for all but the fields due to the current. Hence, these readings may be converted, by an equation similar to Equation 6, to values relating not to pipe-line currents but directly to current gradients.

It is obvious that although the present method has been described for simplicity with regard to the use of a gradiometer of the general type illustrated in Fig. 2, said method can equally well be carried out by means of any other type of gradiometer, which may be defined, for the purposes of this invention as a device having two spaced elements capable of reacting with a magnetic field to produce an electric current related to the difference of the strength of the magnetic field of the locations of said two elements. It is also obvious that in cases where gradiometers of somewhat different types are used, the constants, charts, tables, etc., especially those involving directional or relative concepts such as north and south, plus and minus, right and left, etc., have to be accordingly revised and corrected in a manner understood by those skilled in the art, without such revision affecting, however, the basic principle on which the present method is based. In surveying or inspecting a pipe-line which is so closely adjacent to another parallel pipe-line that the magnetic fields of the two pipe-lines react with each other, the above method may be successfully applied by introducing, from the equations given hereinabove, a suitable calculated correction to the value of the critical distance $y_c$, and of the predetermined critical reading similar to that employed in Example III.

In surveying a single or multiple pipe-line in which currents are artificially caused to flow, as in Cathodic Protection systems, the above method may be successfully employed to determine the suitability of the protective current pattern thus set up; and in this application the method of eliminating the effect of the magnetic fields not due to pipe-line currents may often be simplified by measuring the sum of such field gradients while the protective current is alternately flowing and not flowing; so that the effect due to the current alone is simply the difference of two such readings.

We claim as our invention:

1. In a method for measuring the magnetic field surrounding a pipe line, the steps of establishing in a plane parallel to the axis of the pipe line, said plane being selected only from vertical and horizontal planes, two movable field-sensitive gradiometer elements in fixed space relationship with each other, jointly advancing said elements in said plane along the pipe line and effecting magnetic gradient measurements therebetween, while maintaining said elements at unequal distances from the axis of the pipe line during said advance, determining a location along the pipe line wherein the gradient between said elements in a plane perpendicular to the axis of the pipe line has a predetermined value, jointly shifting said two elements with regard to the axis of the pipe line so as to reduce the distance from at least one of said elements to said axis, and measuring the magnetic gradient between said two elements.

2. In a method for measuring the magnetic field surrounding a pipe line, the steps of establishing in a plane parallel to the axis of the pipe line, said plane being selected only from vertical and horizontal planes, two movable field-sensitive gradiometer elements in fixed space relationship with each other, jointly advancing said elements in said plane along the pipe line and effecting magnetic gradient measurements therebetween, while maintaining said elements at unequal distances from the axis of the pipe line during said advance, determining a location along the pipe line wherein the gradient between said elements in a plane perpendicular to the axis of the pipe line has a zero value, jointly shifting said two elements with regard to the axis of the pipe line so as to reduce the distance from at least one of said elements to said axis, and measuring the magnetic gradient between said two elements.

3. In a method for measuring the magnetic field surrounding a pipe line, the steps of positioning in a horizontal plane parallel to the axis of the pipe line two movable field-sensitive gradiometer elements in fixed space relationship with each other, jointly advancing said elements in said plane along the pipe line and effecting magnetic gradient measurements therebetween, while cyclically varying the ratio of the distances between each of said two elements and the axis of the pipe line during said advance, determining a location along the pipe line wherein the gradient between said elements in a plane perpendicular to the axis of the pipe line has a predetermined value, jointly shifting said two elements with regard to the axis of the pipe line so as to reduce the distance from at least one of said elements to said axis, and measuring the magnetic gradient between said two elements.

4. In a method for measuring the magnetic field surrounding a pipe line, the steps of establishing in a vertical plane parallel to the axis of the pipe line two movable field-sensitive gradiometer elements in fixed space relationship with each other, advancing said elements in said plane along the pipe line and effecting magnetic gradient measurements therebetween while maintaining said elements at fixed unequal distances from the axis of the pipe line during said advance, determining a location along the pipe line wherein the magnetic gradient between said elements in a plane perpendicular to the axis of the pipe line has a predetermined value, moving said two elements from said vertical plane towards a vertical plane containing the axis of the pipe line, and measuring the magnetic gradient between said two elements.

5. In a method for measuring the magnetic field surrounding a pipe line, the steps of establishing in a vertical plane parallel to the axis of the pipe line two movable field-sensitive gradiometer elements in fixed space relationship with each other, advancing said elements in said plane along the pipe line and effecting magnetic gradient measurements therebetween while maintaining said elements at fixed unequal distances from the axis of the pipe line during said advance, determining a location along the pipe line wherein the magnetic gradient between said elements in a plane perpendicular to the axis of the pipe line has a zero value, moving said two elements in said perpendicular plane to a vertical plane containing the axis of the pipe line, and measuring the magnetic gradient between said two elements in said vertical plane passing through the axis of the pipe line.

6. In a method for measuring the magnetic field surrounding a pipe line, the steps of establishing in a horizontal plane above the axis of the pipe line and parallel thereto two field-sensitive gradiometer elements in fixed space relationship with each other and symmetrical with regard to the axis of the pipe line, jointly and simultaneously advancing said two elements in said plane in a direction parallel to the axis of the pipe line and reciprocating them in said plane at right angles to said direction, whereby the relative distances of said elements from the axis of the pipe line are continuously and cyclically varied, measuring the magnetic gradient between said elements during said advance and reciprocation, locating along the pipe line a plane perpendicular to the axis thereof wherein said reciprocation produces substantially no change in the gradient values being measured, selecting for said elements a position symmetrical with regard to the axis of the pipe line on the intersection line of said horizontal plane and said perpendicular plane, and measuring the magnetic gradient between said two elements.

7. In a method for measuring the magnetic field surrounding a pipe line, the steps of selecting a vertical plane spaced from the axis of the pipe line by a predetermined distance, establishing in said plane two movable field-sensitive gradiometer elements in fixed space relationship with each other, jointly advancing said elements in said plane along lines parallel to the axis of the pipe line and effecting magnetic gradient measurements therebetween, determining from said measurements a location for said elements at which the magnetic gradient therebetween has a predetermined value, moving said elements from said location at right angles towards a vertical plane containing the axis of the pipe line, and measuring the magnetic gradient between said elements.

8. In a method for measuring the magnetic field surrounding a pipe line, the steps of selecting a vertical plane spaced from the axis of the pipe line by a predetermined distance, establishing in said plane two movable field-sensitive gradiometer elements in fixed space relationship with each other, jointly advancing said elements in said plane along lines parallel to the axis of the pipe line and effecting magnetic gradient measurements therebetween, determining from said measurements a location for said elements at which the magnetic gradient therebetween has a zero value, moving said elements from said location at right angles to a vertical plane containing the axis of the pipe line, and measuring the magnetic gradient between said elements in said vertical plane containing the axis of the pipe line.

9. In a method for measuring the magnetic field surrounding a pipe line, the steps of selecting a vertical plane spaced from the axis of the pipe line by a predetermined distance, establishing in said plane two movable field-sensitive gradiometer elements in fixed space relationship with each other, jointly advancing said elements in said plane along lines parallel to the axis of the pipe line and effecting magnetic gradient measurements therebetween, determining from said measurements a location for said elements at which the magnetic gradient therebetween has a zero value, moving said elements from said location at right angles to a vertical plane containing the axis of the pipe line, arranging said elements along a line parallel to the axis of the pipe line in said vertical plane containing said axis and measuring the magnetic gradient between said two elements.

10. In a method for measuring the magnetic field surrounding a pipe line, the steps of selecting a vertical plane spaced from the axis of the pipe line by a predetermined distance, establishing in said plane two movable field-sensitive elements in fixed spaced relationship with each other, jointly advancing said elements in said plane along lines parallel to the axis of the pipe line and effecting magnetic gradient measurements therebetween, determining from said measurements a location for said elements at which the magnetic gradient therebetween has a predetermined value, moving said elements from said location at right angles towards a vertical plane containing the axis of pipe line, measuring the magnetic gradient between said two elements, and recording the maximum gradient value recorded before reaching said vertical plane containing the axis of the pipe line.

11. In a method for measuring the magnetic field surrounding a pipe line, the steps of selecting a vertical plane spaced from the axis of the pipe line by a predetermined distance, establishing in said plane two movable field-sensitive elements in fixed space relationship with each other, jointly advancing said elements in said plane along lines parallel to the axis of the pipe line and effecting magnetic gradient measurements therebetween, determining from said measurements a location for said elements at which the magnetic gradient therebetween has a predetermined value, moving said elements from said location at right angles towards a vertical plane containing the axis of pipe line, measuring magnetic gradient between said elements, and recording the minimum gradient value recorded before reaching said vertical plane containing the axis of the pipe line.

12. In a method for measuring the magnetic field surrounding a pipe line, the steps of effecting magnetic gradient measurements in a plane parallel to the axis of the pipe line between two field-sensitive gradiometer elements in fixed mutual space relationship, determining from said measurements the location of a plane perpendicular to the axis of the pipe line in which a joint shift of the position of said two mutually fixed elements with regard to the axis of the pipe lines produces substantially no change in the value of the gradient therebetween, placing said two mutually fixed elements in a position symmetrical with regard to the axis of the pipe line in said plane perpendicular thereto, and measuring the magnetic gradient between said elements.

GEORGE C. ELTENTON.
MARVIN B. FALLGATTER.

REFERENCES CITED

The following references are of record in the file of this patent:

UNITED STATES PATENTS

| Number | Name | Date |
|---|---|---|
| 2,151,627 | Vacquier | Mar. 21, 1939 |
| 2,358,027 | Penther et al. | Sept. 12, 1944 |
| 2,382,743 | Penther et al. | Aug. 14, 1945 |
| 2,407,202 | Vacquier | Sept. 3, 1946 |
| 2,415,808 | Buckley | Feb. 18, 1947 |